United States Patent [19]

Singh et al.

[11] Patent Number: 5,945,166
[45] Date of Patent: Aug. 31, 1999

[54] METHOD FOR FORMING FIBER REINFORCED COMPOSITE BODIES WITH GRADED COMPOSITION AND STRESS ZONES

[75] Inventors: Mrityunjay Singh, Strongsville; Stanley R. Levine, Rocky River; James A. Smialek, Strongsville, all of Ohio

[73] Assignee: The United States of America as represented by the Administrator of the National Aeronautics and Space Administration, Washington, D.C.

[21] Appl. No.: 09/001,584

[22] Filed: Dec. 30, 1997

[51] Int. Cl.$^6$ .............................. B05D 3/02; B05D 1/02; B05D 1/18; B05D 1/38
[52] U.S. Cl. .................. 427/376.2; 427/255.12; 427/380; 427/387; 427/419.7; 427/419.8; 427/427; 427/431; 427/443.2
[58] Field of Search .......................... 427/255, 376.2, 427/387, 380, 376.3, 419.1, 419.7, 419.8, 427, 431, 443.2, 255.12

[56] References Cited

U.S. PATENT DOCUMENTS

| | | | |
|---|---|---|---|
| 4,722,817 | 2/1988 | Nakano et al. | 264/39.5 |
| 4,944,904 | 7/1990 | Singh et al. | 269/60 |
| 5,268,339 | 12/1993 | Aghajanian et al. | 501/127 |
| 5,275,984 | 1/1994 | Carpenter et al. . | |
| 5,316,851 | 5/1994 | Brun et al. . | |
| 5,441,762 | 8/1995 | Gray et al. | 427/190 |
| 5,455,106 | 10/1995 | Steiffer . | |
| 5,628,938 | 5/1997 | Sangeeta et al. | 264/28 |

*Primary Examiner*—Shrive Beck
*Assistant Examiner*—Michael Barr
*Attorney, Agent, or Firm*—Kent N. Stone

[57] ABSTRACT

A near-net, complex shaped ceramic fiber reinforced silicon carbide based composite bodies with graded compositions and stress zones is disclosed. To provide the composite a fiber preform is first fabricated and an interphase is applied by chemical vapor infiltration, sol-gel or polymer processes. This first body is further infiltrated with a polymer mixture containing carbon, and/or silicon carbide, and additional oxide, carbide, or nitride phases forming a second body. One side of the second body is spray coated or infiltrated with slurries containing high thermal expansion and oxidation resistant, crack sealant phases and the other side of this second body is coated with low expansion phase materials to form a third body. This third body consisting of porous carbonaceous matrix surrounding the previously applied interphase materials, is then infiltrated with molten silicon or molten silicon-refractory metal alloys to form a fourth body. The resulting fourth body comprises dense composites consisting of fibers with the desired interphase which are surrounded by silicon carbide and other second phases materials at the outer and inner surfaces comprising material of silicon, germanium, refractory metal suicides, borides, carbides, oxides, and combinations thereof. The resulting composite fourth body has different compositional patterns from one side to the other.

22 Claims, No Drawings

METHOD FOR FORMING FIBER REINFORCED COMPOSITE BODIES WITH GRADED COMPOSITION AND STRESS ZONES

ORIGIN OF THE INVENTION

The invention described herein was made in the performance of work under a NASA contract and is subject to the provisions of §305 of the National Aeronautics and Space Act of 1958, Public Law 85-568 (72 Stat. 435; 42 U.S.C. 2457).

FIELD OF THE INVENTION

The present invention relates to a ceramic composition and a method for forming thereof and, more particularly, to a ceramic fiber reinforced silicon carbide comprised of composite bodies and having graded composition and stress zones that provide a composite ceramic to serve for usage in high temperature applications requiring thermal and environmental stability and good thermal shock resistance.

BACKGROUND OF THE INVENTION

Fiber reinforced silicon carbide matrix composites having high temperature applications requiring thermal and environmental stability and good thermal shock resistance are commonly used for combustion and exhaust components in jet and rocket engines, ceramic burner inserts, and heat exchanger tubes. Composite carbide matrix materials are well known and some of which materials are disclosed in U.S. Pat. Nos. 5,275,984; 5,316,851; and 5,455,106, all of which are herein incorporated by reference.

The combustion and exhaust components, in order to serve their intended purpose, have to be operated at high temperatures and under mechanical and thermal stresses. In some cases, thermal stresses result from a temperature gradient through the thickness of the composite, making up the component, when one surface of the composite, serving as the component, sees a much high temperature than the other surface. The hot side of the component may be in compression and would benefit from reduced thermal expansion. The cold surface of the component may be in tension and would benefit from higher thermal expansion. It has been observed that prior art fiber reinforced silicon carbide matrix is often microcracked due to these stresses and oxygen penetrates to the interface of the fiber-matrix, through these microcracks. The interface, as well as the fibers, becomes oxidized thereby leading to the failure of these composites used as combustion and exhaust components. Also, hot surfaces (>2000° F.) of these combustion and exhaust components are subject to the loss of the silica protective scale by volatilization as SiO or $Si(OH)_4$.

It is desired that in order to make successful use of these silicon carbide matrix composites, matrix cracks should be sealed to prevent oxygen and corrosive gas ingress to the fibers and interfaces therein. Thus, it is important to grade the composition and generate various stress zones so that the matrix cracks would self heal or seal under high temperature operating conditions. These sealed cracks will stop the ingress of oxidants into the interior of the composites and thereby prevent catastrophic failure. Various processing techniques used in the prior art including hot pressing and sintering, chemical vapor infiltration, and polymer infiltration and pyrolysis are not useful in fabricating ceramic composites with graded composition and stress zones.

Accordingly, it is a primary object of the present invention to provide silicon carbide matrix composites having means for sealing matrix cracks so as to prevent oxygen and corrosive gas ingress to the ceramic fiber and interfaces making up the silicon carbide matrix composites that serve as high temperature components.

Further, it is an object of the present invention to provide silicon carbide matrix composites with graded compositions and stress zones.

It is another object of the present invention to provide silicon carbide matrix composites serving as combustion and exhaust components having a first side with high thermal expansion, oxidation resistance, and crack sealant means and a second side with low expansion means.

It is a still further object of the present invention to provide silicon carbide matrix composites having compositional patterns which lead to differential volumetric expansion/contraction yielding tailored stress zones and also having an oxidation behavior that differs across the thickness of the silicon carbide matrix composites and is tailored to the exposure temperature and environment.

SUMMARY OF THE INVENTION

The present invention is directed to a method for forming a ceramic composite having graded compositions and stress zones and that is particularly suited to serve as combustion and exhaust components in jet and rocket engines, ceramic burner inserts, heat exchanger tubes, and other high temperature components.

The method of forming a ceramic composite comprising the steps of: (a) providing a refractory fiber preform; (b) infiltrating the fiber preform with a mixture selected from polymer/resin; (c) curing the infiltrated fiber preform at a temperature from about 60° C. to about 90° C.; (d) heating the cured, infiltrated fiber preform at about 600° to about 700° C. in an inert environment so as to convert the selected mixture to carbon; (e) defining first and second sides of the heated, cured, infiltrated fiber preform as being hot and cold operated sides respectively;

(f) treating the hot operated side with a liquid selected from paint or slurry each containing germanium powder and a fugitive binder; (g) treating the cold operated side with a boron containing paint or slurry; and (h) infiltrating the fiber preform having the treated hot and cold operated side with molten material selected from the group comprising molten silicon and binary silicon-refractory metal alloys.

In another embodiment, the hot operated side is treated with a material selected from the group comprising silicides of group III B combined with silicon carbide, titanium, zirconium, hafnium, and refractory metal-based carbides, nitrides, oxides, germanides and combinations of the refractory metals.

In a further embodiment, the cold operated side is treated with silicon carbide and refractory disilicide ($TiSi_2$, $ZrSi_2$, $HfSi_2$, $NbSi_2$, $TaSi_2$ and others) constituents.

DETAILED DESCRIPTION OF THE PREFERRED EMBODIMENTS

The present invention relates to a silicon carbide matrix composite and a method of forming thereof that may be applied to many different fields, but it is contemplated by the present invention that the ceramic and its method are particularly suited for providing combustion and exhaust components for use in jet and rocket engines, ceramic burner inserts, and heat exchanger tubes.

In general, the method of the present invention for forming a ceramic composite comprises the steps of: (a) providing a refractory fiber preform; (b) infiltrating the fiber preform with a mixture selected from furfural alcohol resin and (polymer/resin); (c) curing the infiltrated fiber preform at a temperature from about 60° C. to about 90° C.; (d) heating the cured, infiltrated fiber preform at about 600° to about 700° C. in an inert environment so as to convert the selected mixture to porous carbon; (e) defining first and second sides of heated, cured, infiltrated fiber preform as being hot and cold operated sides respectively; (f) treating the hot operated side with a liquid selected from paint or slurry each containing germanium powder and a fugitive binder; (g) treating the cold operated side with a boron containing paint or slurry; and (h) infiltrating the fiber preform having the treated hot and cold operated side with molten material selected from the group comprising molten silicon and binary silicon-refractory metal alloys.

The method of the present invention starts with the selection of a preform that is preferably treated by chemical vapor infiltration (CVI) so as to provide a toughness (known in the art) characteristic thereof. The fiber preform may be made, in a manner known in the art, with any type of carbon, silicon carbide, silicon nitride, or oxide based fibers. The fiber preform may also be made from combinations of the carbon, silicon carbide, silicon nitride and oxide based fibers, all in a manner known in the art. The preforms of desired shapes and sizes to serve as any desired combustion, exhaust, and high temperature components may be made by any of the commonly practiced techniques such as filament winding, 2-D fiber cloth lamination, 3-D weaving, braiding, or stitching.

In the preferred embodiment, these fiber preforms are chemical vapor infiltrated (CVI), in a manner known in the art, by various gases to provide a desirable interphase for toughness and oxidation resistance in the final ceramic composite of the present invention. The interphase material used to form the preforms could be single, double, or multilayer in nature so as to provide optimum composite properties. This interphase material also advantageously provides the rigidity in the fiber preform which is intended to be handleable without any support after this first step using the chemical vapor infiltration (CVI). Other techniques, such as chemical vapor deposition (CVD), may be also used to accomplish the first step of coating and rigidization of the selected preform.

In the preferred embodiment, a porous carbonaceous matrix preform is accomplished with a polymer/resin mixture. A typical mixture contains a furfural alcohol resin, pore forming agents (ethylene, diethylene, triethylene, and glycols having relatively high molecular weights such as polyethylene glycols), shrinkage reducing constituents (such as carbon and silicon carbide), and p-toluene sulfonic acid or hydrochloric acid with either acid acting as a catalyst. The furfural alcohol resin is available from Great Lakes Chemical Corporation, West Lafayette, Ind., carrying the tradename Quacorr 1300 Resin; the glycols are available from Aldrich Chemical Co., Milwaukee, Wis., identified as Di, Tri, and Polyethylene Glycols; the carbon is available from J. T. Huber Co., Borger, Tex., identified as Aerosperse 15 V Carbon Powder; the silicon carbide powder is available from BYK-Chemie USA, Wallingford, Conn., carrying their tradename BYK-55; the sulfonic acid is available from Aldrich Chemical Co., Milwaukee, Wis., identified as p-Toluene Sulfonic Acid; the hydrochloric acid is available from Aldrich Chemical and other suppliers of ingredients used in the practice of the present invention are Rohm and Haas Co., Philadelphia, Pa., supplying an ingredient under the tradename Triton X-100; Albemarle Corporation, Pasadena, Tex., supplying Silicon Powder; H. C. Stark, Newton, Mass., supplying Silicon Carbide Powder under their tradename (UF-10); and Alfa Aesar (Johnson Mathey), Ward Hill, Mass., supplying an ingredient under their tradename Silicon Lump.

After curing at 60–90° C., this typical mixture produces an interconnected solid polymer within the interconnected pores of the preform. The preform is then heated to 600 to 700° C. in an inert environment to convert the selected polymer/resin mixture to porous carbon at a heating rate in the range from about 2° C./min to about 3° C./min.

The next step in the process is to identify the side of the now infiltrated, cured and heated preform which will operate hotter as 'H' and the side which will operate colder as 'C'. More particularly, the preform, after further treatment to be described, serves as an exhaust and combustion component and the surfaces of the preform are now defined as being the hot and cold operated surfaces so as to be properly treated to serve its intended purpose. Next, the 'H' and 'C' sides are spray coated or infiltrated with different types of functional constituents. The surface marked 'H' is treated with a slurry or paint containing germanium powder and a fugitive binder (poly vinyl alcohol or polyethylene glycol or combination thereof). It is preferred that the germanium powder have a granularity in the range from about 100 mesh and lower. The other surface marked 'C' is spray coated or infiltrated with boron containing slurries. Germanium and boron based organometallic or polymeric compounds which yield germanium and boron after decomposition can also be used in the practice of the present invention.

The preform with different surface coatings is now infiltrated with molten silicon or binary silicon-refractory metal(s) alloys. Typically, the infiltration temperatures are between 1350–1450° C., and the infiltration times are between 15–45 minutes. However, it should be noted that the time and temperature of infiltration is governed by, among other factors, the type of infiltrant, wetting behavior, and shape and size of the component, all of which may be handled in a manner known in the art. After the melt infiltration of the molten substance, the resulting product is a composite with the graded composition so as to serve the needs of the present invention. This composite also has different stress conditions at the surface than in the bulk of the material. The different stress conditions provide for the different stress zones so as to further serve the needs of the present invention. During high temperature oxidation and thermal cycling low melting germanium silicates will enable the silica scales to retain their self-healing ability near the hot face 'H' by the reduction in the viscosity of silica. In addition, thermal expansion coefficient and stresses in the scale of the silica can also be tailored by adjusting the amount of germanium oxide which will reduce the spalling of silica scale during thermal cycling. At the cold side 'C', the previously described low melting boron oxide-silica seals the microcracks previously discussed in the "Background" section.

It should now be appreciated that the practice of the present invention provides a ceramic composite having different composition patterns from one side of the ceramic composite to the other side. The different composition pattern provides ceramic composites with graded composition and stress zones.

The ceramic composite serving as combustion and exhaust component and operating at high temperatures, provides compositional patterns that lead to differential volumetric expansion/contraction yielding tailored stress zones. Further, the ceramic composite provides an oxidation behavior differing across its thickness and which may be tailored to the exposure temperature and environment in which it serves.

In another embodiment of the present invention a graded composition of hot face surface layers may be provided by the selection of titanium, zirconium, hafnium, and other refractory metal-based carbides, nitrides, oxides, germanides, and their combinations. Other examples of hot face graded compositions of the present invention are the suicides of group III B (such as, Sc, Y, Pr and Ce) combined with silicon carbide. These phases of matter, such as the refractory metal-based carbides, can be formed by the spray coating of the selected compounds in a polymer mixture as well as by the infiltration of silicon-refractory and/or the infiltration of rate earth metal containing binary and ternary alloys. Thermodynamic activity of silica is also reduced or eliminated and a modified oxide film will protect the components, such as the spray-on components.

In a still further embodiment of the present invention, fiber reinforced composites with graded composition with silicon carbide and refractory disilicide constituents in the outer layers of the cold side 'C' are provided. These refractory disilicide constituents e.g., $ZrSi_2$, $MoSi_2$, $NbSi_2$, $TiSi_2$ and other compounds can be applied by spray coating or by first infiltrating the cold operated surfaces with molybdenum, niobium, or titanium powder containing powder/polymer mixture or liquid polymers and then spray coating with the selected constituent. Some of these refractory disilicide constituents can also be obtained by the reaction of silicon and silicon alloy infiltrants with molybdenum carbide, molybdenum nitride, niobium carbide and niobium nitride and their mixtures in various proportions. These refractory disilicide constituents whose compositions could be varied from to 10–60% of the mixture making up the outer layers of the cold operated surfaces have higher thermal expansion coefficients than those of silicon carbide. The microcracks in the outer layers of the matrix, previously discussed in the "Background" Section, are sealed and ultimately lead to reduced environmental damage to fibers and interface/interphase materials making up the ceramic composite of the present invention.

By the application of the method of any of the embodiments of the present invention hereinbefore described, dense silicon carbide composites with graded compositions and stress zones can be fabricated. The processing approach of any of the method described herein, can be used not only to fabricate composite bodies with graded composition and stress zones by melt infiltration provided by the selected molten material, but also bodies made by different ceramic processing methods. More particularly, ceramic composite bodies may be made by chemical vapor infiltration, reaction-bonding of silicon with nitrogen, ceramic polymer precursor infiltration and pyrolysis, or may be made by any other process that produces a material that is porous and may be processed by any of the approaches of any of the embodiments described herein.

The present invention has been described with reference to a preferred embodiment and alternates thereof. It is believed that any modifications and alterations to the embodiment as discussed herein will readily suggest themselves to those skilled in the art upon reading and understanding the detailed description of the invention. It is intended to include all such modifications and alterations in so far as they come within the scope of the present invention.

What we claim is:

1. A method of forming a ceramic composite comprising the steps of:

(a) providing a refractory fiber preform;

(b) infiltrating the fiber preform with a mixture selected from polymer/resin mixture;

(c) curing the infiltrated fiber preform at a temperature from about 60° C. to about 90° C.;

(d) heating the cured, infiltrated fiber preform at about 600° to about 700° C. in an inert environment so as to convert said selected mixture to carbon;

(e) defining first and second sides of said heated, cured, infiltrated fiber preform as being hot and cold operated sides respectively under operating conditions;

(f) treating only said hot operated side with a liquid selected from paint or slurry each containing germanium powder and a fugitive binder;

(g) treating only said cold operated side with a boron powder containing paint or slurry; and (h) infiltrating the fiber preform having the treated hot and cold operated sides with a molten material selected from the group consisting of molten silicon and molten binary silicon-refractory metal alloys.

2. The method according to claim 1, wherein said provided refractory fiber preform is an interphase material selected from the group consisting of carbon, silicon carbide, silicon nitride, oxide based fibers and combinations thereof.

3. The method according to claim 2, wherein said selected interphase material is selected from one of the types consisting of single, double and multilayer constituents.

4. The method according to claim 3, wherein said infiltrating of step (c) of claim 1 is accomplished by a chemical vapor infiltration (CVI) process.

5. The method according to claim 1, wherein said selected mixture of step (c) contains furfural alcohol resin, pore forming agents, shrinkage reducing constituents and a catalyst.

6. The method of claim 5, wherein said pore forming agents are selected from the group consisting of ethylene, diethylene, triethylene, and glycols having a relatively high molecular weight, wherein said shrinkage reducing constituents are selected from the group consisting of carbon and silicon carbide, and wherein said catalyst is selected from the group consisting of p-toluene sulfonic acid and hydrochloric acid.

7. The method according to claim 1, wherein said heating of said step (d) is accomplished at a rate in the range from about 2° C./min to about 3° C./min.

8. The method according to claim 1, wherein said germanium powder of step (f) is a fine powder having a granularity in the range from about 100 mesh and lower.

9. The method according to claim 8, wherein said germanium powder and boron powder are selected from the group consisting of (1) germanium and boron based organometallic compounds and (2) germanium and boron polymeric compounds.

10. The method according to claim 1, wherein said fugitive binder of step (f) is selected from the group consisting of poly vinyl alcohol and polyethylene glycol and combinations thereof.

11. The method according to claim 1, wherein said slurry of step (g) is applied to said cold operated side from a process selected from the group consisting of spray coating and infiltration.

12. The method according to claim 1, wherein said infiltration of step (h) is performed at temperatures in the range from about 1350° C. to about 1450° C. for a time in the range from about 15 minutes to about 45 minutes.

13. A method of forming a ceramic composite comprising the steps of:

(a) providing a refractory fiber preform;

(b) infiltrating the fiber preform with a mixture selected from polymer/resin mixture;

(c) curing the infiltrated fiber preform at a temperature from about 60° C. to about 90° C.;

(d) heating said cured, infiltrated fiber preform at about 600° C. to about 700° C. in an inert environment so as to convert said selected mixture to porous carbonaceous matrix;

(e) defining first and second sides of said heated, cured, infiltrated fiber preform as being hot and cold operated sides respectively under operating conditions;

(f) treating only said hot operated side with a material selected from the group consisting of silicides of group III B combined with silicon carbide, titanium, zirconium, hafnium, and refractory metal-based carbides, nitrides, oxides, germanides and combinations of said refractory metals;

(g) treating only said cold operated side with a boron containing slurry; and (h) infiltrating the fiber preform having the treated hot and cold operated side with molten material selected from the group consisting of molten silicon and binary silicon-refractory metal alloys.

14. The method according to claim 13, wherein said hot operated side of step (f) is treated with a process selected from the group consisting of spray coating said selectable material in a polymer mixture, infiltrating said fiber preform with silicon-refractory metals, and infiltrating said fiber preform with rare earth metals containing binary and ternary alloys.

15. A method of forming a ceramic composite comprising the steps of:

(a) providing a refractory fiber preform;

(b) infiltrating the fiber preform with a mixture selected from polymer and resin;

(c) curing the infiltrated fiber preform at a temperature from about 60° C. to about 90° C.;

(d) heating the cured, infiltrated fiber preform at about 600° to about 700° C. in an inert environment so as to convert said selected mixture to carbon;

(e) defining first and second sides of said heated, cured, infiltrated fiber preform as being hot and cold operated sides respectively;

(f) treating said hot operated side with a liquid selected from paint and slurry each containing germanium powder and a fugitive binder;

(g) treating said cold operated side with silicon carbide and refractory disilicide constituents; and (h) infiltrating the fiber preform having the treated hot and cold operated side with a molten material selected from the group consisting of a molten silicon and molten binary silicon-refractory metal alloys.

16. The method according to claim 15, wherein said refractory disilicide constituents are selected from the group consisting of $ZrSi_2$, $MoSi_2$, $NbSi_2$ and $TiSi_2$.

17. The method according to claim 16, wherein said selected refractory disilicide constituents are applied to said cold operated side by spray coating.

18. The method according to claim 16, wherein said selected refractory disilicide constituents are applied to said cold operated side with a material selected from the group consisting of zirconium, molybdenum, niobium and titanium and a polymer binder powder.

19. The method according to claim 16, wherein said selected refractory disilicide constituents are applied to said cold operated side with a material selected from the group consisting of zirconium, molybdenum, niobium and titanium with a polymer mixture.

20. The method according to claim 16, wherein said selected refractory disilicide constituents are applied to said cold operated side by first infiltrating the cold operated surface with a material selected from the group consisting of zirconium, molybdenum, niobium and titanium containing a liquid polymer.

21. The method according to claim 16, wherein said refractory disilicide constituents of step (g) of claim 15 are obtained by a reaction of silicon and silicon alloy infiltrants with a material selected from the group consisting of molybdenum carbide, molybdenum nitride, niobium carbide and niobium nitride and mixtures thereof.

22. The method according to claim 21, wherein said refractory disilicide constituents of step (g) consist of about 10% to about 60% of the mixture of said silicon carbide and refractory disilicide constituents.

* * * * *